(12) United States Patent
Peretz et al.

(10) Patent No.: US 10,732,739 B2
(45) Date of Patent: Aug. 4, 2020

(54) SYSTEM AND METHOD TO DYNAMICAL CALIBRATE PHASE OF A STYLUS SIGNAL

(71) Applicant: Microsoft Technology Licensing, LLC, Redmond, WA (US)

(72) Inventors: Ahia Peretz, Ramat-Gan (IL); Vadim Mishalov, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 15/784,222

(22) Filed: Oct. 16, 2017

(65) Prior Publication Data
US 2019/0113987 A1 Apr. 18, 2019

(51) Int. Cl.
*G06F 3/041* (2006.01)
*G06F 3/038* (2013.01)
*G06F 3/0354* (2013.01)
*G06F 3/044* (2006.01)

(52) U.S. Cl.
CPC ........ *G06F 3/0383* (2013.01); *G06F 3/03545* (2013.01); *G06F 3/041* (2013.01); *G06F 3/044* (2013.01); *G06F 3/0418* (2013.01); *G06F 2203/04101* (2013.01)

(58) Field of Classification Search
CPC .......................... G06F 3/03545–03546; G06F 2203/041–04113; G06F 3/041–0428; G06F 1/1643; G06F 1/169–1698; G06K 9/32–3283

See application file for complete search history.

(56) References Cited

U.S. PATENT DOCUMENTS

| | | | |
|---|---|---|---|
| 2006/0139339 A1* | 6/2006 | Pechman | ............ G06F 3/03547 345/177 |
| 2010/0155153 A1 | 6/2010 | Zachut | |
| 2015/0279297 A1* | 10/2015 | Nakano | .................. G06F 3/041 345/173 |
| 2015/0324029 A1 | 11/2015 | Bakken et al. | |
| 2016/0188007 A1 | 6/2016 | Jung et al. | |
| 2016/0209940 A1 | 7/2016 | Geller et al. | |
| 2017/0031465 A1 | 2/2017 | Jung et al. | |

OTHER PUBLICATIONS

"International Search Report and Written Opinion Issued in PCT Application No. PCT/US2018/054898", dated Jan. 7, 2019, 14 Pages.

\* cited by examiner

*Primary Examiner* — Sanghyuk Park

(57) ABSTRACT

A method includes receiving by wireless transmission, a first signal transmitted by a digitizer system. The first signal is configured to define a detection period during which a second signal may be detected by the digitizer system. The method further includes detecting timing of the receiving, detecting a first delay in the receiving due to amplification associated with the receiving, defining timing to transmit the second signal based on the timing of the receiving and the first delay and transmitting the second signal at the timing defined. The second signal is transmitted with a handheld device by wireless transmission and the first delay is detected by the handheld device that is receiving the first signal and transmitting the second signal.

20 Claims, 10 Drawing Sheets

SYSTEM AND METHOD TO DYNAMICAL CALIBRATE PHASE OF A STYLUS SIGNAL

BACKGROUND

Styluses are known in the art for use with digitizer sensors such as with a digitizer sensor that is integrated with a display screen to form a touch screen. Stylus position is sensed by the digitizer sensor and used to provide input to a computing device associated with the display screen. Position of the stylus is correlated with virtual information displayed on the display screen and based on the correlation, inputs from the stylus are interpreted as user commands or user inputs for commands. Communication between the stylus and the digitizer sensor is typically based on wireless communication A touch screen may include a digitizer sensor overlaid on a Flat Panel Display (FPD), a digitizer sensor integrated on a protective glass layer of the FPD (on-cell technology) or a digitizer sensor integrated as part of the display panel of the FPD (in-cell technology).

SUMMARY

The present disclosure describes a circuit and method to improve synchronization of stylus transmissions with detection events in a digitizer system with which the stylus is interacting. According to some example embodiments, the circuit and method provides for aligning a phase of a signal transmitted by a stylus with a phase of a correlating function generated by a digitizer circuit. Optionally, phase alignment with accuracy in the order of magnitude of nanoseconds may be achieved based on the disclosed system and method. According to some example embodiments, a control loop included in circuitry of the stylus is configured to track variable delays in a wireless communication channel of the stylus and adjust transmission timings based on the detected delays. Variable delays may be expected in analog components of the channel and due to variable ambient conditions, variable voltage levels and aging of electric components of the wireless communication channel. According to other example embodiments, a control loop included in circuitry of the digitizer system is configured to detect best synchronization based on requesting that the stylus shift transmission timings by defined shifts and comparing received energy for each of the defined shifts.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
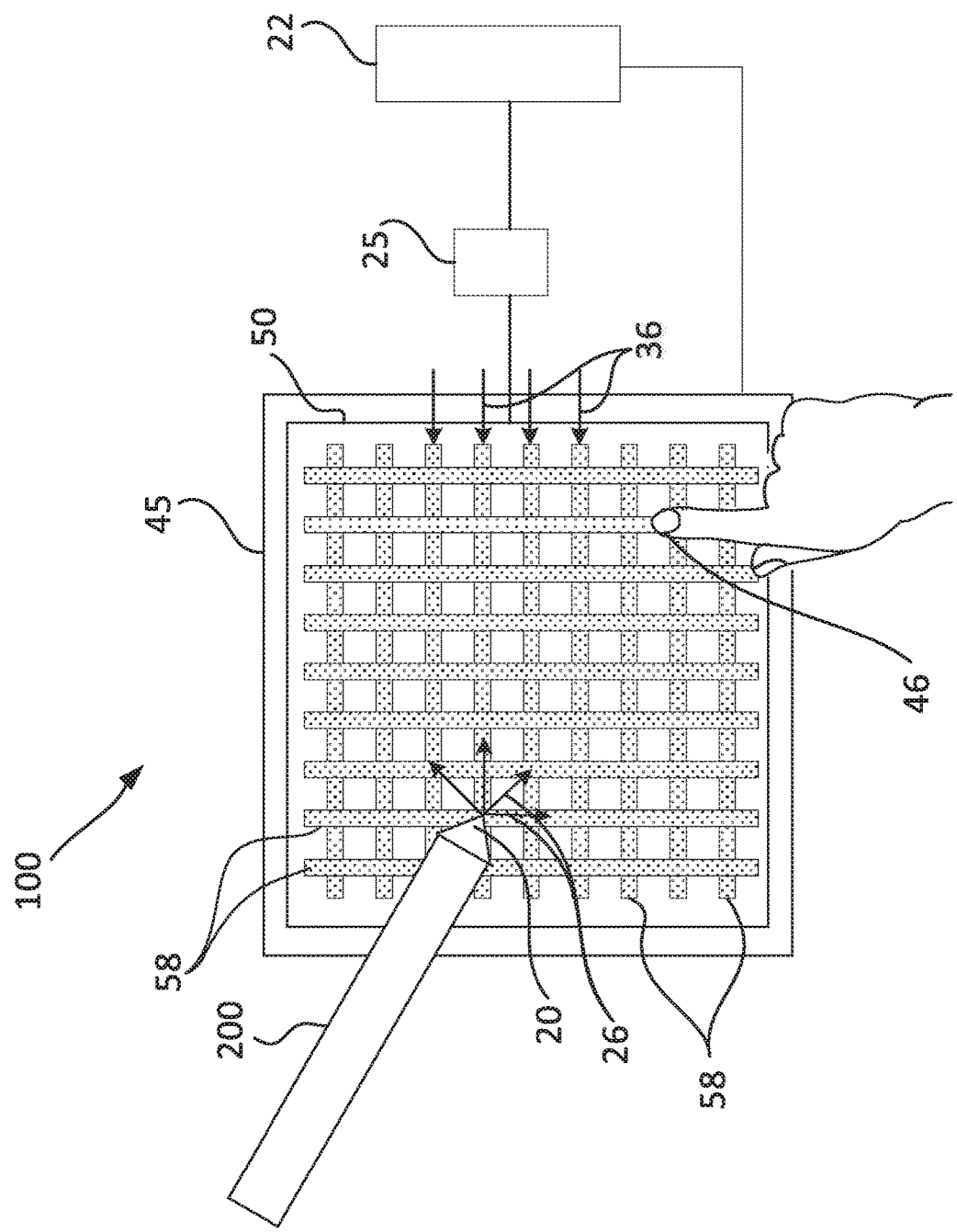
FIG. 1 is a simplified block diagram of an example computing device with a touch-screen for tracking stylus input.

Some known styluses interact with a digitizer system by transmitting periodic signal bursts. The signals in the bursts may have a defined frequency known to the digitizer system. The digitizer system is able to track the stylus as long as the periodic signal bursts are transmitted during a detection period of the digitizer system. During detection, a digitizer circuit may detect input from the stylus by multiplying outputs from the digitizer sensor with a generated signal having the same pre-defined frequency as the stylus. Such a detection method is sensitive to phase alignment between the stylus signal and the generated signal. Any misalignment in the phase results in at least partial signal cancellation of the detected signal. An in-phase quadrature receiver (I/Q receiver) may be used in place of a phase sensitive receiver to avoid signal degradation due to phase errors. However adding an I/Q receiver to each receive line in a grid based digitizer sensor may significantly increase complexity of the receiver circuit.

According to some example embodiments, there is provided a control loop circuit and method configured to improve phase alignment of stylus transmission during interaction with a digitizer system. According to some example embodiments, a digitizer system is configured to periodically transmit an uplink signal that indicates timing for transmission. The stylus may be instructed to begin its transmission cycles at a pre-defined time after receiving the uplink signal. Accuracy of the indication provided by the uplink signal may be limited due to variable delays associated with analog components of the receiving circuit as well as the transmitting circuit of the stylus that receives the uplink signal and in response provides transmission. The delays may due to varying properties of the analog components due to variations in ambient conditions, variation between components due to manufacturing, variation based on changes in voltage or based on aging of the components. In some example embodiments, the delay, typically in the order of magnitude of milliseconds or nano-seconds may shift the phase of the transmitting signal and the imposed phase shift may adversely affect detection of the stylus signal on the digitizer end.

According to some example embodiments, a circuit in the stylus is configured to periodically detect a delay imposed by a receiving circuit of the stylus, by a transmitting circuit of the stylus or by both the receiving and transmitting circuits, and to correct timing of the transmission based on the detected delay. In some example embodiments, a stylus calibration circuit detects a delay in the receiving circuit by feeding a generated signal through the analog receiving circuit as well through a matched digital circuit and comparing detection time. In some example embodiments, a stylus calibration circuit detects a delay in the transmitting circuit based on feeding output from the transmitting circuit to the stylus calibration circuit and comparing timing to input to the transmitting circuit. The calibration procedure may be initiated in response to detecting a tip down event and may be repeated at defined intervals. Optionally, calibration is performed repeatedly during tip down events.

According to some other example embodiments, calibration is controlled by a digitizer system as opposed to the stylus. In some example embodiments, the digitizer system is configured to monitor changes in received signal strength in response to defined shifts in timing of transmissions and to send instructions to the stylus to adjust or tune transmission to a timing that yields the best signal strength. Calibration may be initiated as soon as the digitizer circuit becomes aware of the stylus or as soon as a first tip down event is recorded after a defined period during which no stylus input was received and may be repeated periodically. Optionally, the calibration circuit may continuously update calibration as long as tip down events are detected.

Reference is now made to FIG. 1 showing a simplified block diagram of an example computing device with a touch-screen for tracking stylus input. According to some implementations, a computing device 100 includes a display screen 45 integrated with a digitizer sensor 50. Digitizer sensor 50 may be integrated with display 45 by bonding digitizer sensor 50 onto a display stack, or by using out cell, on cell, or in cell digitizer technologies in which the digitizing elements share circuits within display 45.

In some example embodiments, digitizer sensor 50 may be a grid based capacitive sensor including conductive lines 58 arranged in a grid that define junctions. Sensor 50 may be operated to detect both input by stylus 200 and to detect a finger effect due to one or more fingertips 46 or other conductive objects interacting with sensor 50. The finger effect may be sensed based on mutual capacitive detection or a self-capacitive detection. Typically, during mutual capacitive and self-capacitive detection, digitizer circuitry 25 generates and sends a drive signal 36 (interrogation signal or triggering signal) to one or more conductive lines 58 of digitizer sensor 50 and samples output in response to the interrogation.

Digitizer circuit 25 may additionally sample outputs from conductive lines 58 to detect a signal 26 emitted by stylus 200 and locally picked up by conductive lines 58 near a tip 20 of stylus 200. Optionally, digitizer circuit includes dedicated sampling periods for each of finger effect detection and stylus detection. Stylus 200 may be pressure sensitive and may transmit information related to pressure applied on tip 20 as well as other information related to the stylus. Digitizer circuit 25 may demodulate information such as pressure transmitted by stylus 200.

A digitizer circuit 25 controls operation of digitizer sensor 50 and stylus 200 and communicates with host circuit 22. Digitizer circuit 25 may manage and transmit a synchronization signal to stylus 200 to synchronize stylus transmissions to sampling periods of digitizer circuit 25. In some example embodiments, the synchronization signal to stylus 200 is also the drive signal 36 applied for finger touch detection. Optionally, drive signal 36 is modulated and includes data that can be demodulated by stylus 200. In other example embodiments, digitizer circuit 25 transmits a dedicated signal separate from drive signal 36 to one or more conductive lines 58 for synchronizing stylus 200. In yet other embodiments, digitizer circuit 25 may transmit synchronization information via an alternate wireless communication channel, e.g. Bluetooth or Near Field Communication (NFC). Digitizer circuit 25 may alternate between sampling output to detect signal 26 and scanning conductive strips 58 to sense one or more fingertips 46.

Digitizer circuitry 25 may use both analog and digital processing to process signals detected with digitizer sensor 50. Optionally, some or all of the functionalities of digitizer circuit 25 may be integrated into host 22. Typically, output from digitizer circuitry 25 is reported to host 22. Typically, digitizer circuit 25 is configured to track location of stylus 200 and fingertips 46. Typically, the output provided by digitizer circuitry 25 to host 22 may include coordinates of one or more fingertips 46, coordinates of writing tip 20 of stylus 200 and additional data provided by stylus 200, e.g. pressure, tilt, and battery level.

Figure 2:
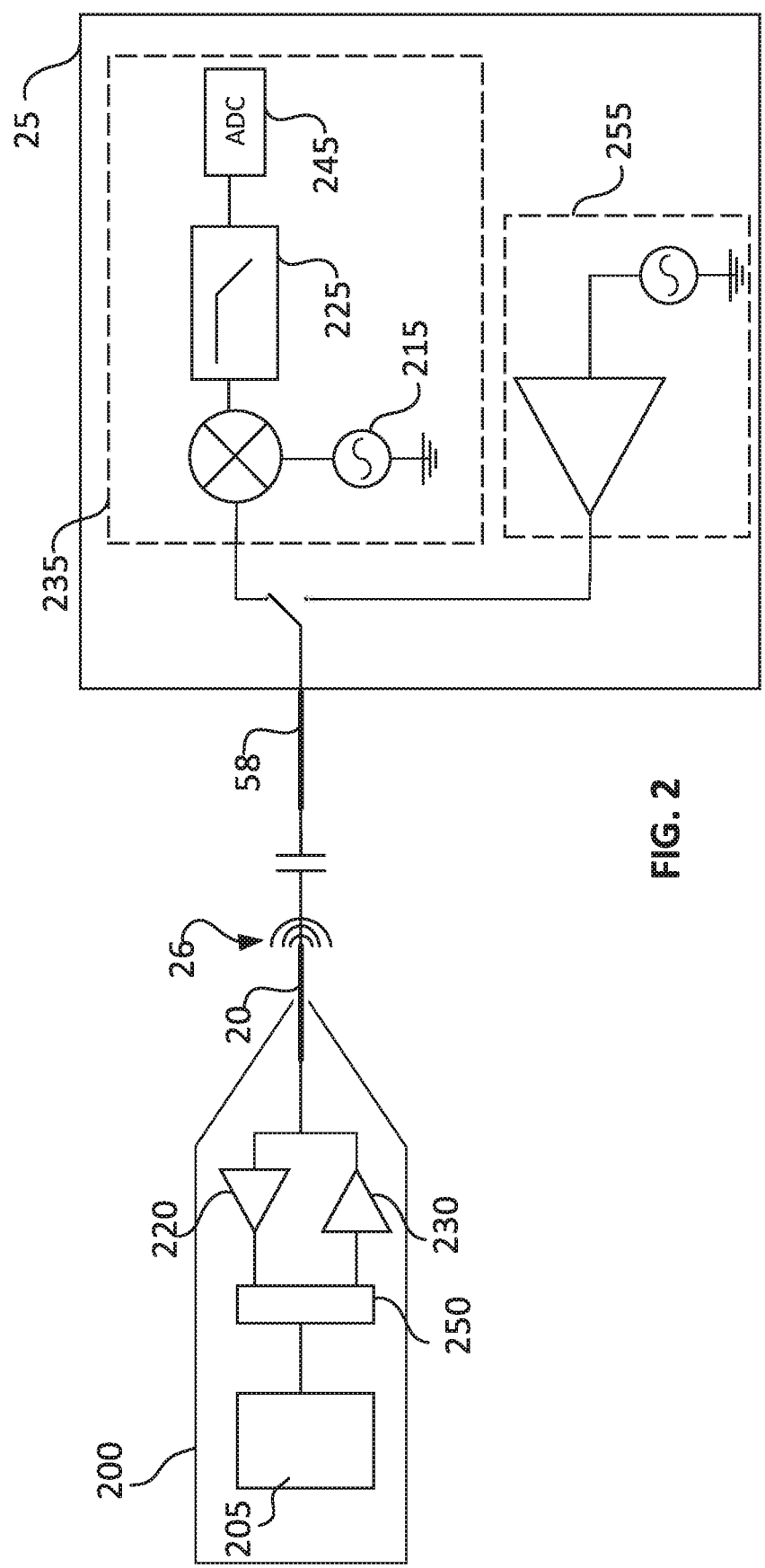
FIG. 2 is a simplified block diagram of an example wireless communication channel between a stylus and a digitizer circuit.

Reference is now made to FIG. 2 showing a simplified block diagram of an example wireless communication channel between a stylus and a digitizer circuit. A circuit in stylus 200 may include a receiver 220 for receiving input via tip 20 from digitizer circuit 25, a transmitter 230 for transmitting signals via tip 20 to conductive lines 58 of digitizer sensor 50 and a digital circuit 250 configured to control operation of the stylus. Optionally, operation of the circuit in stylus 200 is powered by an internal power source 205. Digital circuit 250 may be configured to sample input from an analog receiver 220 and based on the input, initiate transmission of signal 26 with transmitter 230. Transmitter 230 of stylus 200 is typically configured to transmit signal 26 at a frequency that is known to digitizer circuit 25.

Digitizer circuit 25 may include a digitizer receiving circuit 235 per conductive line 58 of digitizer sensor 50 to detect energy received by stylus 200. Digitizer circuit 25 additionally includes a transmitting circuit 255 configured to transmit an uplink signal to stylus 200 via conductive lines 58 and digitizer circuit 25 may switch between transmitting an uplink signal and detecting energy on conductive lines 58 during reach refresh cycle of the digitizer system. Alternatively, the uplink signal may be transmitted by an alternative wireless channel.

Typically, a plurality of conductive lines 58 of digitizer sensor 50 may pick up signal 26. Receiving circuit 235 may correlate output from conductive lines 58 with a generated signal 215 having same frequency as signal 26. A product of correlating the input with a generated signal 215 may be expressed by the following equation:

$$A \cdot \sin(2\pi f + \varphi) \cdot \sin(2\pi f) = 0.5A(\cos(\varphi) - \cos(4\pi f + \varphi)) \quad \text{Equation (1)}$$

Where:
A is the gain of signal 26;
f is the known frequency of the signal 26; and
φ is phase shift between received and generated signal The product may then be filtered with a low pass filter 225 to remove high frequency components prior to sample with an Analog to Digital Converter (ADC) for further processing. Low pass filter 225 removes the higher frequency component 'cos(4πf+φ)' so that the input that is sampled by ADC 245 may be a function of phase shift as defined by the following equation:

$$E = 0.5A(\text{vos}(\varphi)) \quad \text{Equation (2)}$$

This detection method is sensitive to phase alignment between signal 26 and generated signal 215. While φ=0, 'E', the energy detected by ADC 245 on one of conductive lines 58 is maximum and when φ=π/2, energy, 'E' is zero. Phase shift φ typically varies over time due to changes in ambient conditions, operation modes of the stylus and aging of analog components.

In some example embodiments, a phase shift may arise due to one or more delays associated with analog components of the wireless communication channel. For example, analog receiver 220 may impose a delay in receiving the uplink signal while amplifying the received signal and the delay may be reflected in the detected timing of the uplink signal as detected by digital circuit 250. The delay although small, e.g. in the order of magnitude of 10 s of nanoseconds or 10 s of milliseconds may lead to a significant phase shift of signal 26 with respect to generated signal 215. Furthermore, analog transmitter 230, e.g. high voltage transmitter may impose a delay in the reception of the stylus signal. The delay imposed by the transmitter may be in the same order of magnitude as that of receiver 220. Likewise, additional delays may be imposed due to analog components in digitizer circuit 25.

One method for compensating for the inherent phase shift φ may be by adding a phase matching component in each receiving circuit 235. However, since digitizer sensor 50 includes a relatively large number of conductive lines 58 and circuit 25 includes a receiving circuit 235 for each of conductive lines 58, power consumption, processing time and complexity of digitizer circuit 25 may be significantly increased by including the phase matching component for each receiving circuit 235.

Instead in accordance with some example embodiments, stylus 200 may be configured to dynamically track delays imposed by its analog components and adjust timing of its transmissions to compensate for the delays. Further compensation may be performed by digitizer circuit 25 based on digitizer circuit 25 tracking imposed by its analog components.

Alternatively, digitizer circuit 25 may search control calibration of the stylus transmission by requesting the stylus to perturb timing of transmissions and evaluating the gain in response to different perturbations in timing. The perturbation related to the best gain may then be assumed to be the desired timing for transmission.

Detecting Adjustments to Transmission Timings with the Stylus

Figure 3:
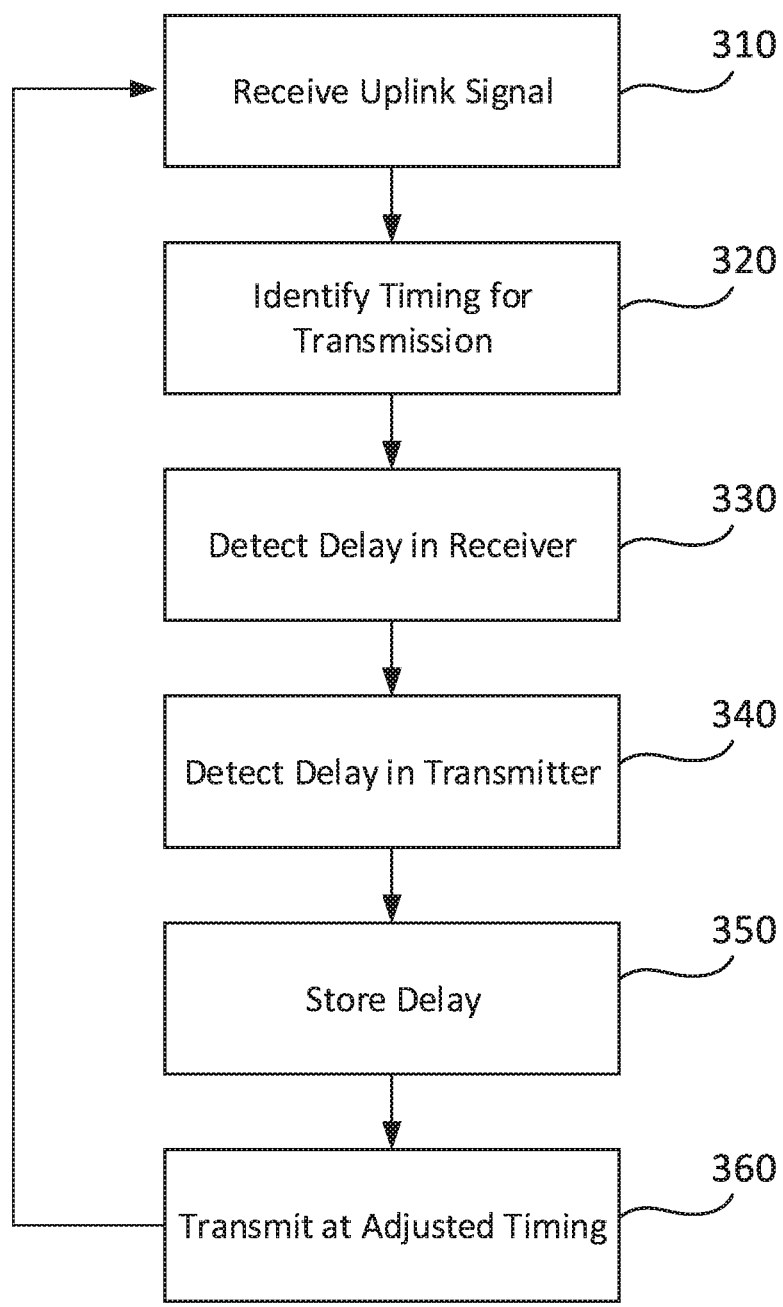
FIG. 3 is a simplified flow chart of an example method for a stylus to dynamically calibrate a phase of its signal transmissions.

Reference is now made to FIG. 3 showing a simplified flow chart of an example method for a stylus to dynamically calibrate phase of its signal transmissions. In some example embodiments, a stylus receives uplink signals from a digitizer circuit (block 310) and identifies timing for transmission based on a detected time that the uplink signal is received (block 320). A calibration circuit included in the stylus may detect a delay in receiving the uplink signal due to operational characteristics of the receiver (block 330) and may detect an expected delay in transmitting the uplink signal due to operational characteristics of the transmitter (block 340). Transmission of the stylus signal may be adjusted to compensate for the detected delays (block 350). The detected delays may be stored in the stylus and applied in subsequent transmission cycles to adjust timing of transmission (block 360). The stored delay may be updated periodically, e.g. whenever the calibration circuit is activated.

Figure 4:
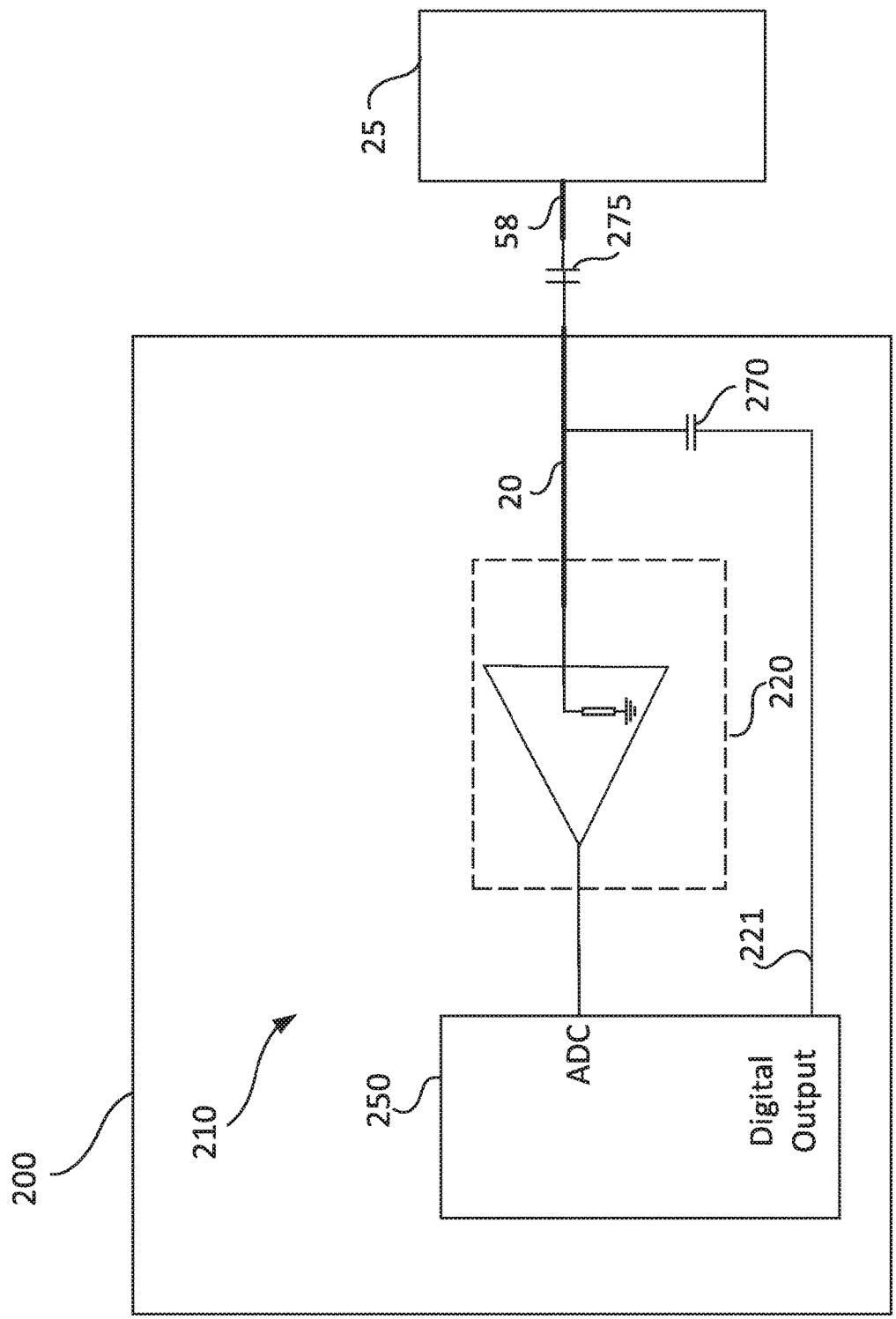
FIG. 4 is simplified circuit diagram of an example circuit in a stylus configured to detect delay associated with a receiving circuit of the stylus.

Reference is now made to FIG. 4 showing a simplified circuit diagram of an example circuit in a stylus configured to detect delay associated with a receiving circuit of the stylus. In some example embodiments, stylus 200 includes a circuit 210 in stylus 200 configured to dynamically detect delays incurred by high voltage receiver 220. In circuit 210, an uplink signal 221 generated by digital circuit 250 may be transmitted to high voltage receiver 220 and a delay in receiving output from high voltage receiver 220 may be detected based on comparing timing of transmission to timing of the receiving. Circuit 210 may additionally include a calibrating capacitor 270 that is selected together with uplink signal 221 to mimic a signal typically received by tip 20 from a digitizer system. Optionally, uplink signal 221 is amplified with a low voltage amplifier prior to transmitting the signal to high voltage receiver 220. Calibrating capacitor 270 may be defined based on the following equation:

$$C_{Calb} = \frac{V_D}{V_d} \cdot C_{tip} \quad \text{Equation (3)}$$

Where:
$C_{Calb}$ is capacitor 270
$V_D$ is voltage typically received on tip 20 from a digitizer system
$V_d$ is voltage from uplink signal 221; and
$C_{tip}$ is expected capacitance between stylus tip 20 and conductive line 58.

Digital circuit 250 may be configured to detect timing of reception from receiver 220 and receiver 223 and determine the delay imposed by receiver 220 based on the difference in the detected timings. The detected delay may be stored by digital circuit 250 and used to adjust timings for transmitting a signal via tip 20.

Figure 5:
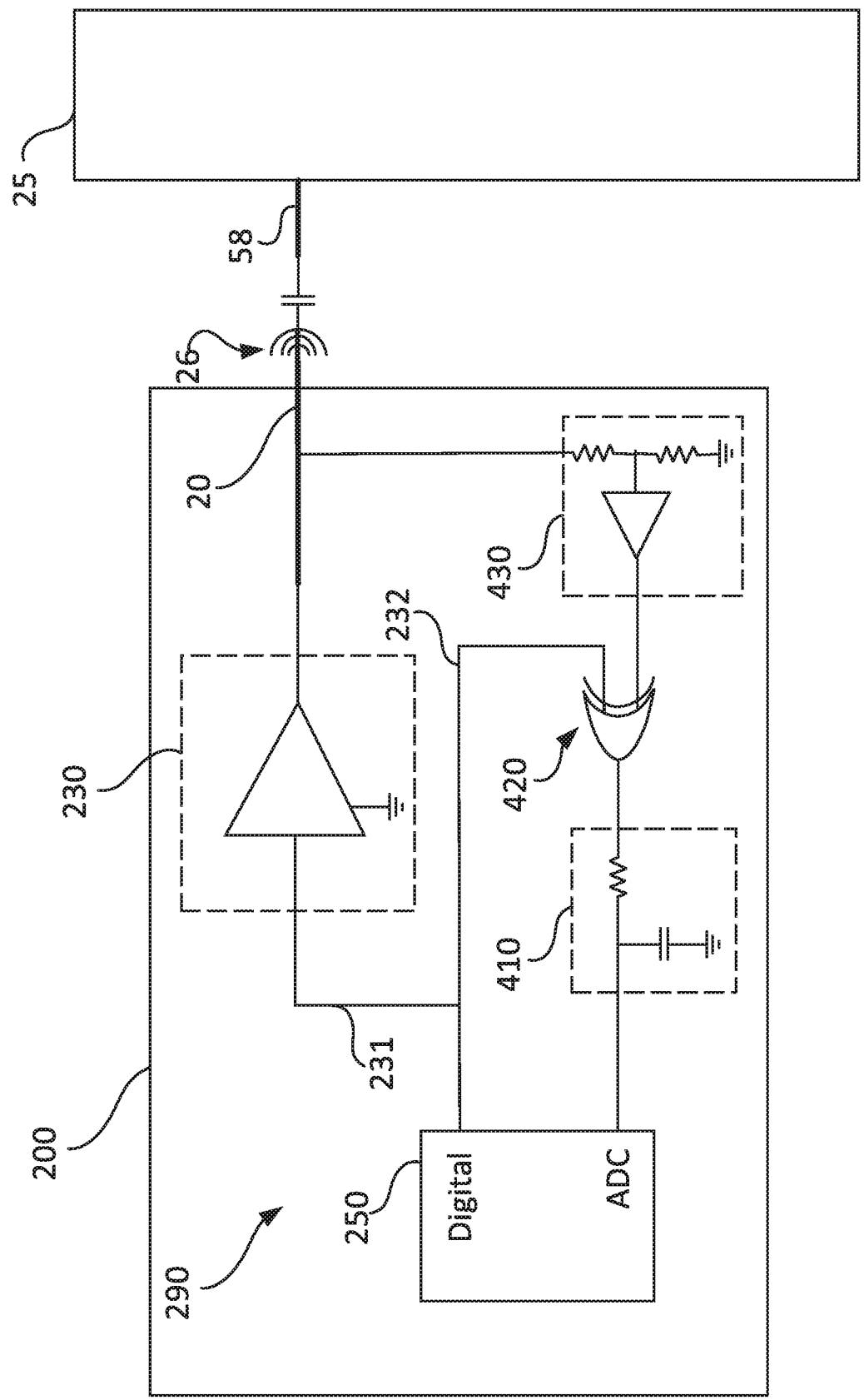
FIG. 5 is a simplified circuit diagram of an example circuit in a stylus configured to detect delay associated with a transmitting circuit of the stylus.
Figure 6A:
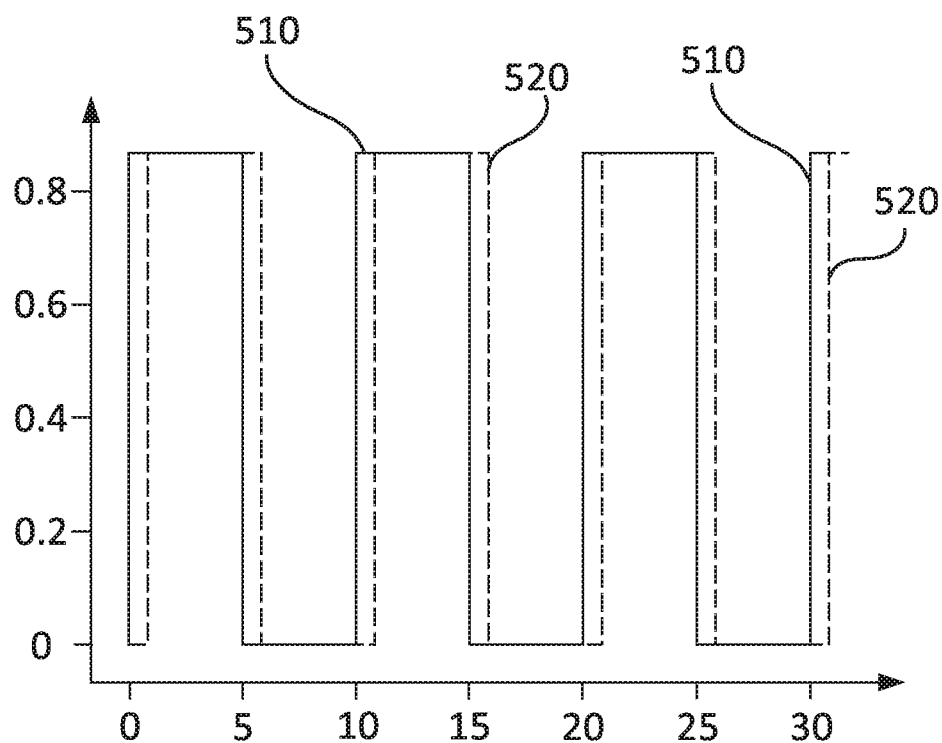
FIGS. 6A and 6B are simplified graphs showing exemplary signals detected from the calibration circuit while a relatively small delay is imposed by a transmitting circuit of the stylus.
Figure 6B:
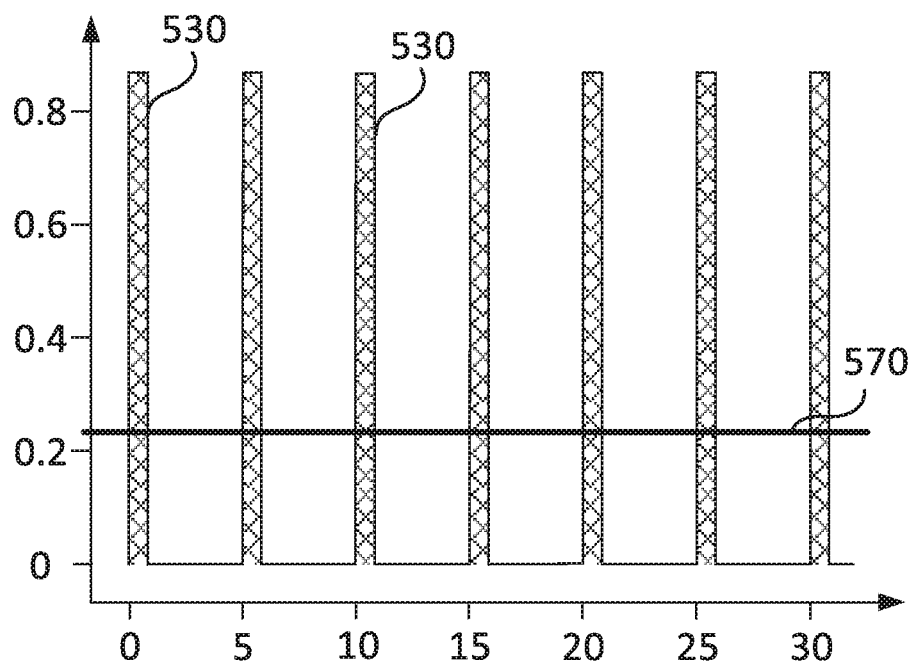

Reference is now made to FIG. 5 showing a simplified circuit diagram of an example circuit in a stylus configured to detect delay associated with a transmitter of the stylus. In some example embodiments, stylus 200 includes a circuit 290 configured to detect delay in transmitting a signal 26 with a high voltage transmitter 230. Circuit 290 may inject an amplified signal 26 back into digitizer circuit 250 and compare timing for receiving signal 26 with timing of providing input to transmitter 230. A level shifter 430 in contact with tip 20 may pick up signal 26 amplified by transmitter 230 and reduce its gain to a level that may be detected with digital circuit 250. Delay associated with level shifter 430 is expected to be negligible. Digital circuit 250 may detect time at which input 232 is received originating from level shifter 430 and compare timing with timing an input 231 to transmitter 230 that produced signal 26. In some example embodiments, an XOR gate combines output from level shifter 430 with input to transmitter 230 and filters the XOR combination with a low pass filter 410 to detect an average value. The average value may be sampled by digital circuit 250 and based on the average value a delay associated with transmitter 230 may be determined.

Reference is now made to FIGS. 6A, 6B, 7A and 7B showing simplified graphs of exemplary signals detected from the transmitter calibration circuit while a relatively small and a relatively large delay is imposed. Signals 520 (FIG. 6A) and 525 (FIG. 7A) are two example outputs from level shifter 430 and signal 510 is an example input signal to transmitter 230. Each of signals 520 and 525 include a delay imposed due to high voltage transmitter 230. Signal 520 is representative of a relatively small delay and signal 525 is representative of a relatively large delay imposed by voltage transmitter 230.

Figure 7A:
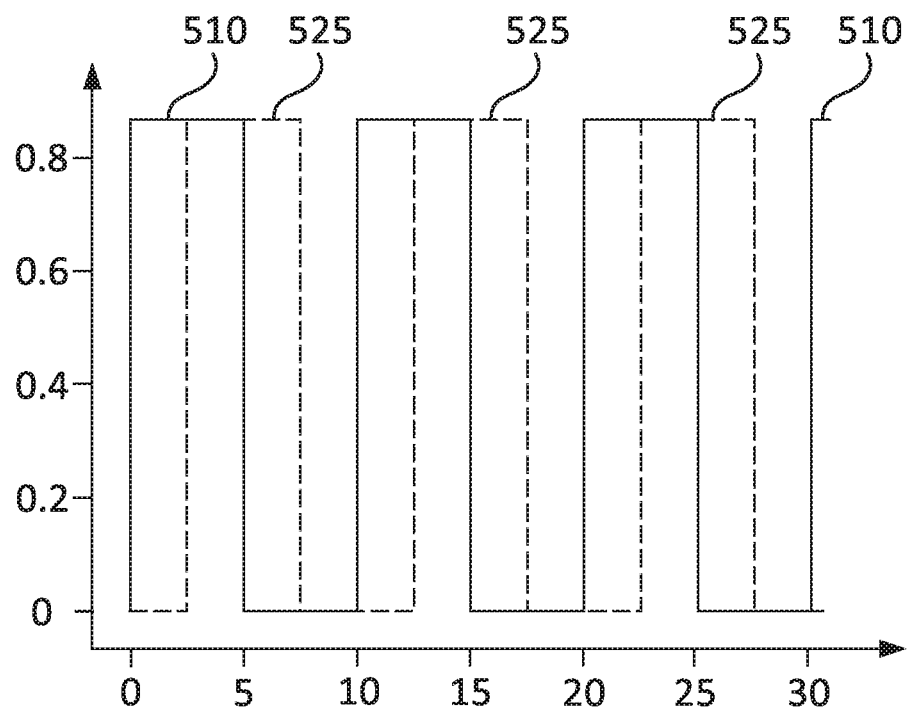
FIGS. 7A and 7B are simplified graphs showing exemplary signals detected from the calibration circuit while a relatively large delay is imposed by a transmitting circuit of the stylus.
Figure 7B:
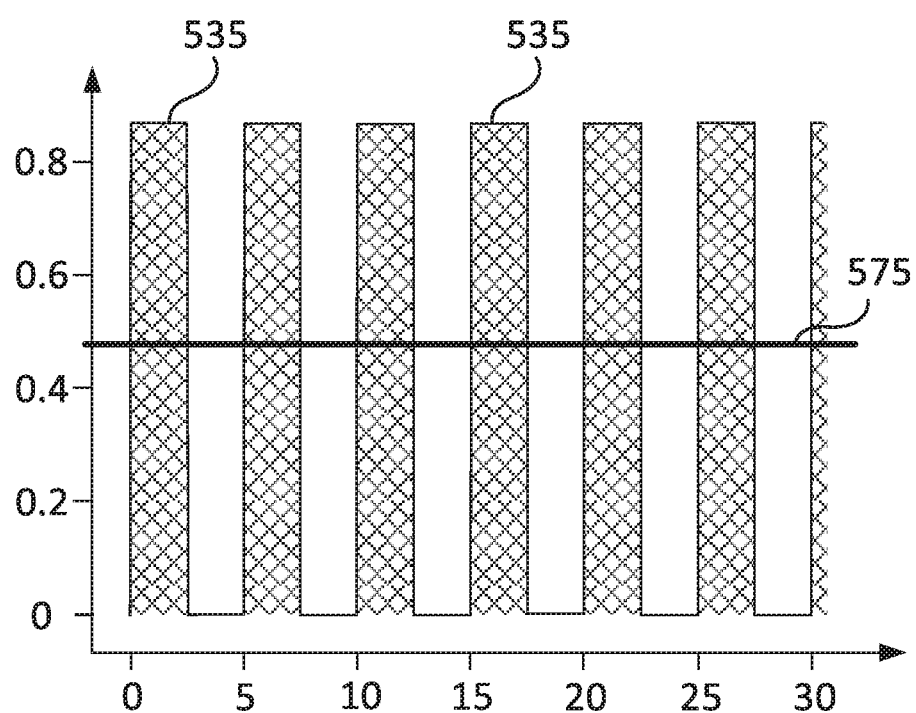

In some example embodiments, an XOR gate may be used to detect the phase shift the level shifted signal and the input signal. Output 530 (FIG. 6B) represents an example output of XOR gate 420 for input signals 510 and 520 and output 535 (FIG. 7B) represents an example output of XOR gate 420 for input signals 510 and 525. Width of peaks 530 and 535 are related to the delay imposed by transmitter 230. For relatively small delays, widths of output from XOR gate are narrow, e.g. signal 530 for relatively larger delays, width of output from XOR gate are wider, e.g. signal 535. Low pass filter 410 provides an average of the peaks and the average value may be sampled and used by circuit 250 to determine the delay. For example, an average level after filtering may be level 570 (FIG. 6B) for signal 520 and 575 for signal 525 (FIG. 7B). Optionally, a look up table or a defined function is stored in circuit 250 and applied to determine the delay. Alternatively, the levels detected are directly applied to compensate for the delay related to transmitter 230.

Detecting Adjustments to Transmission Timings with the Digitizer System

Figure 8:
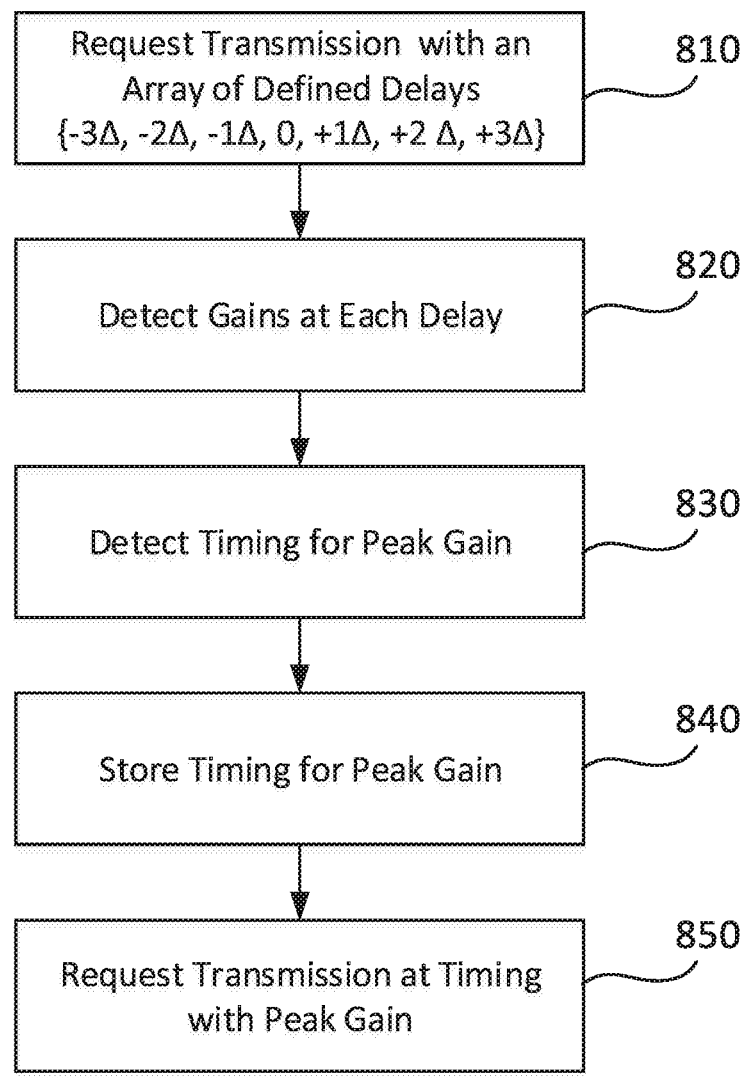
FIG. 8 is a simplified flow chart of an example method for a digitizer circuit to dynamically calibrate phase of stylus signal transmissions.

Reference is now made to FIG. 8 showing a simplified flow chart of an example method for a digitizer circuit to dynamically calibrate phase of stylus signal transmissions and to a simplified graph of example gains detected in response to an array of defined phase shifts. In some example embodiments, a digitizer circuit may detect phase alignment between the stylus and the receiver based on the sampled gain of the received stylus signal. This method is based on the expectation that the energy detected will be at a maximum when the phase shift between the stylus and digitizer is zero as discussed in reference to Equation (2). According to some example embodiments, a digitizer circuit is configured to search for the peak in gain based on requesting consecutive transmissions from the stylus with an array of different defined delays in transmissions, e.g. {−3Δ, −2Δ, −1Δ, 0, +1Δ, +2Δ, +3Δ) block (810). Since the frequency of the signal being transmitted is known to the digitizer circuit, the digitizer circuit may request delays that are a fraction of the period of the signal. For example, for a signal transmitted at frequency 150 Hz, Δ maybe in the order of magnitude of 1 ms or 0.1 ms.

Figure 9:
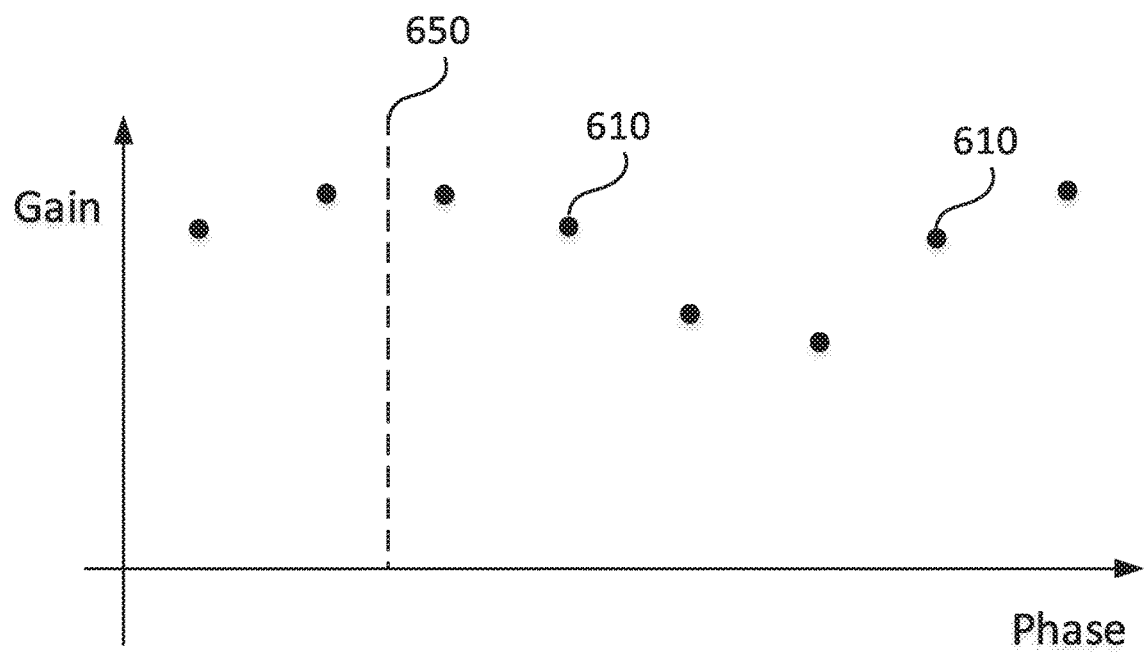
FIG. 9 is a simplified graph of example gains detected by a digitizer circuit in response to an array of defined phase shifts.

Gains related to each shift in the array may be detected (820). An example array of gains 610 is shown in FIG. 9. It may be assumed that the height and position of the stylus above the digitizer sensor may not significantly change over the consecutive samplings at which the array of gains is detected. Furthermore, stylus position may be tracked to verify that there have been no significant changes over the consecutive samplings at which the array of gains is detected. For example, for a refresh period of 266 Hz, 5 consecutive sampling points may be detected within 18 seconds. Change in gain due to phase shift may be expected to be significantly larger than any change in gain due to movement of the stylus between consecutive refresh periods of the digitizer system.

Based on the array of gains detected, a timing 650 (FIG. 9) for peak gain block may be determined (block 830). Timing 650 at peak gain may be selected at one of the detected gains or based on interpolation. Timing 650 may be stored in memory (block 840) and digitizer circuit may request transmission at a new timing that matches timing of peak gain (block 850) for future transmissions. Optionally, the adjustment in timing may be actuated by adjusting a timing at which a synchronization signal is transmitted to the stylus. Alternatively, timing of the synchronization signal is not altered and adjustment in timing may be actuated by transmitting data to the stylus that indicates an adjustment to the transmission times. This calibration method may be repeated periodically to detect changes in the phase alignment. The phase shift between the stylus and the digitizer may have a plurality of different source. Optionally, the delay is due to analog components in the stylus and due to analog components in the digitizer circuit.

Figure 11:
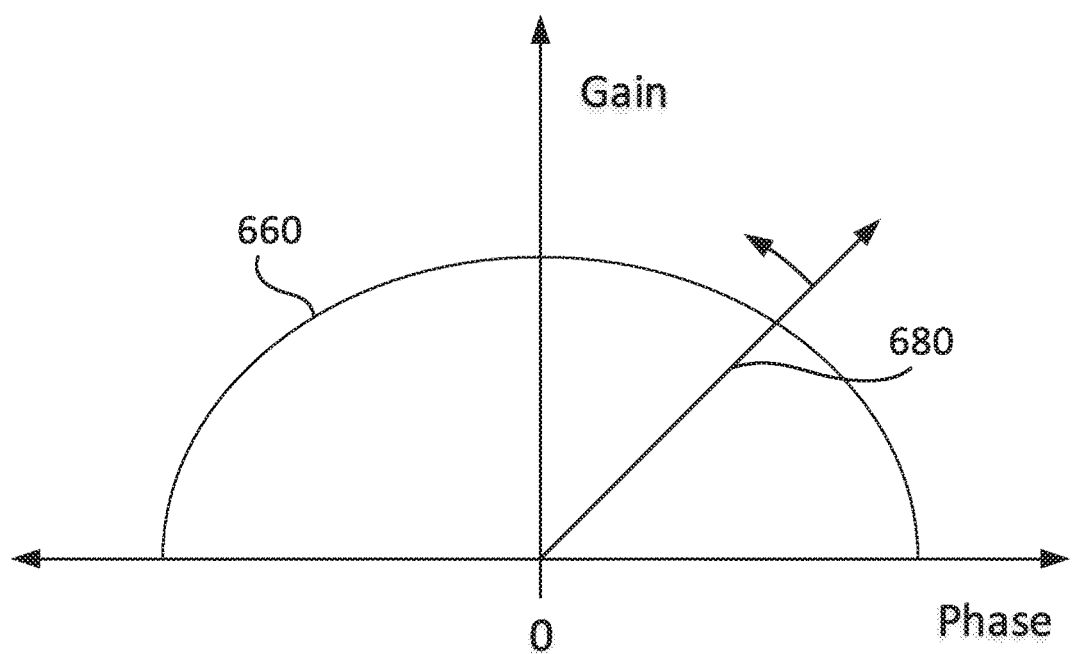
FIG. 11 is a simplified graph of expected gain as a function of phase alignment between the transmitting circuit of the stylus and receiving circuit of the digitizer circuit.
Figure 10:
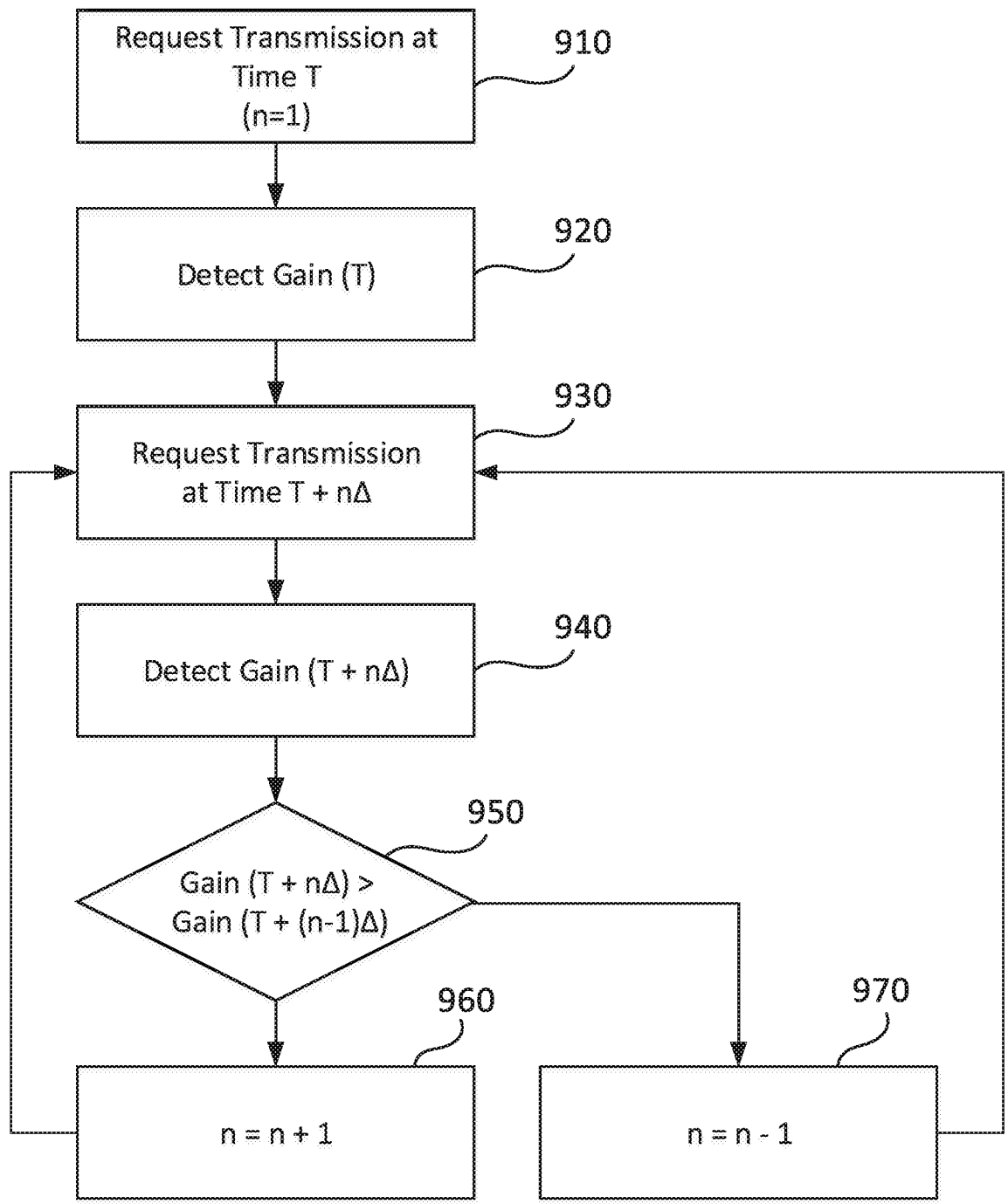
FIG. 10 is a simplified flow chart of an example iterative method for a digitizer circuit to dynamically calibrate phase of stylus signal transmissions.

Reference is now made to FIG. 10 showing a simplified flow chart of an example iterative method for a digitizer circuit to dynamically calibrate phase of stylus signal transmissions and to FIG. 11 showing a simplified graph of expected gain as a function of phase alignment between the transmitter of the stylus and the receiver of the digitizer circuit. In response to requesting transmission at time T (block 910), a signal is transmitted by the stylus and a gain of the receive signal is detected (block 920). In some example embodiments, the digitizer circuit may request transmission at a time T+Δ to check if an adjustment is needed for the transmission time, e.g. to check of the adjustment improves the gain (block 930). Gain of the signal 680 may be detected based on the shift in transmission timing (block 940) if the gain detected is higher than that detected at time T, an additional shift may be requested in the same direction (block 960). This process may be continued until the gain starts to drop which indicates that the peak gain was either at the previous sampling timing or between the previous sampling timing and the current timing. When the gain detected in response to transmission at T+Δ decreases, digitizer system may switch direction of phase shift to in the opposite direction to reach the peak in gain 660 over one or more iterations in that direction block (970).

According to an aspect of some embodiments there is provided a method comprising: receiving by wireless transmission, a first signal transmitted by a digitizer system, wherein the first signal is configured to define a detection period during which a second signal may be detected by the digitizer system, wherein the second signal is transmitted with a handheld device by wireless transmission; detecting timing of the receiving; detecting a first delay in the receiving due to amplification associated with the receiving; defining timing to transmit the second signal based on the timing of the receiving and the first delay; and transmitting the second signal at the timing defined, wherein the first delay is detected by the handheld device that is receiving the first signal and transmitting the second signal.

Optionally, detecting the first delay is initiated based on detecting physical contact of the handheld device with a sensing surface of the digitizer system.

Optionally, the detecting the first delay is initiated based on detecting hovering of the handheld device within a pre-defined height over a sensing surface of the digitizer system.

Optionally, the first delay is dynamically updated during user interaction with the digitizer system.

Optionally, the first delay is detected based on: generating a test signal in the handheld device, transmitting the test signal via tethered connection to a wireless receiving circuit of the handheld device; and detecting a delay in receiving the test signal, wherein the first delay is defined as the delay in receiving the test signal.

Optionally, the test signal is transmitted to the wireless receiving circuit via a calibrating capacitor, wherein the calibrating capacitor is selected together with the test signal to mimic the first signal.

Optionally, the method comprises detecting a second delay due to amplification associated with the transmitting; and defining timing to transmit the second signal based on the timing of the receiving, the first delay and the second delay.

Optionally, detecting the second delay comprises: level shifting the second signal to gain of an input signal to the transmitter; and comparing phase of the level shifted signal to phase of the input signal to the transmitter.

Optionally, the comparing is based on an XOR gate logic.

Optionally, the method includes storing the first delay detected; and adjusting timing for transmitting subsequent signals generated by the handheld device based on the first delay.

Optionally, the handheld device is a stylus.

According to an aspect of some example embodiments, there is provided a handheld device comprising: a housing; and a circuit housed in the housing, wherein the circuit comprises: an analog receiver configured to receive a first signal by wireless transmission, wherein the first signal is configured to define a detection period during which a second signal may be detected by a digitizer system, wherein the second signal is transmitted by wireless transmission; a digital circuit configured to sample output from the analog receiver and determine timing of the receiving based on the sampling; a calibration circuit configured to: detect a first delay associated with the receiving, incurred by the analog receiver; define timing to transmit the second signal based on the timing of the receiving and the first delay; and an analog transmitter configured to transit the second signal at the timing defined.

Optionally, the device comprises a pressure sensor configured to detect to detect physical contact of the handheld device with a sensing surface of the digitizer system.

Optionally, the circuit is configured to initiate detecting the first delay based on the pressure sensor sensing physical contact of the handheld device with a sensing surface of the digitizer system.

Optionally, the circuit is configured to dynamically update the first delay while the handheld device is being used to interact with the digitizer system.

Optionally, the circuit is configured to: detect a second delay associated with the transmitting, incurred by the analog transmitter; and define timing to transmit the second signal based on the timing of the receiving, the first delay and the second delay.

Optionally, the circuit is configured to correct a phase shift between the second signal and a receiver of the digitizer system.

According to an aspect of some example embodiments, there is provided a method comprising: receiving signals bursts by wireless transmission from a handheld device interacting with a digitizer sensor, wherein the signal bursts are received over defined transmission periods; detecting energy of the signal bursts received by the digitizer sensor; transmitting commands to the handheld device to shift timings of the transmission periods by an array of pre-defined shifts over an array of subsequent cycles; selecting one of pre-defined shifts in the array based on the detected power associated with the one pre-defined shift; and transmitting a command to the handheld device to calibrate timing of the transmission periods by the selected pre-defined shift.

Optionally, the commands to the handheld device to shift timings of the transmission periods are transmitted based on an iterative process and in which a change in gain due to a shift in timing is detected at each iteration.

Optionally, the pre-defined shifts are in the order of magnitude of 1 millisecond.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
   receiving by wireless transmission, a first signal transmitted by a digitizer system, wherein the first signal is configured to define a detection period during which a second signal may be detected by the digitizer system, wherein the second signal is transmitted with a handheld device by wireless transmission;
   detecting timing of the receiving;
   detecting a first delay in the receiving due to amplification associated with the receiving;
   defining timing to transmit the second signal based on the timing of the receiving and the first delay; and
   transmitting the second signal at the timing defined,
   wherein the first delay is detected by the handheld device that is receiving the first signal and transmitting the second signal.

2. The method of claim 1, wherein detecting the first delay is initiated based on detecting physical contact of the handheld device with a sensing surface of the digitizer system.

3. The method of claim 1, wherein the detecting the first delay is initiated based on detecting hovering of the handheld device within a pre-defined height over a sensing surface of the digitizer system.

4. The method of claim 1, wherein the first delay is dynamically updated during user interaction with the digitizer system.

5. The method of claim 1, wherein the first delay is detected based on:
   generating a test signal in the handheld device;
   transmitting the test signal via tethered connection to a wireless receiving circuit of the handheld device; and
   detecting a delay in receiving the test signal, wherein the first delay is defined as the delay in receiving the test signal.

6. The method of claim 5, wherein the test signal is transmitted to the wireless receiving circuit via a calibrating capacitor, wherein the calibrating capacitor is selected together with the test signal to mimic the first signal.

7. The method of claim 1, comprising:
  detecting a second delay due to amplification associated with the transmitting; and
  defining timing to transmit the second signal based on the timing of the receiving, the first delay and the second delay.

8. The method of claim 7, wherein detecting the second delay comprises:
  level shifting the second signal to gain of an input signal to the transmitter; and
  comparing phase of the level shifted second signal to phase of the input signal to the transmitter.

9. The method of claim 8, wherein the comparing is based on an XOR gate logic.

10. The method of claim 1, comprising:
  storing the first delay detected; and
  adjusting timing for transmitting subsequent signals generated by the handheld device based on the first delay.

11. The method of claim 1, wherein the handheld device is a stylus.

12. A handheld device comprising:
  a housing; and
  a circuit housed in the housing, wherein the circuit comprises:
  an analog receiver configured to receive a first signal by wireless transmission, wherein the first signal is configured to define a detection period during which a second signal may be detected by a digitizer system, wherein the second signal is transmitted by wireless transmission;
  a digital circuit configured to sample output from the analog receiver and determine timing of the receiving based on the sampling;
  a calibration circuit configured to:
    detect a first delay associated with the receiving, incurred by the analog receiver;
    define timing to transmit the second signal based on the timing of the receiving and the first delay; and
  an analog transmitter configured to transit the second signal at the timing defined.

13. The handheld device of claim 12, comprising a pressure sensor configured to detect to detect physical contact of the handheld device with a sensing surface of the digitizer system.

14. The handheld device of claim 13, wherein the circuit is configured to initiate detecting the first delay based on the pressure sensor sensing physical contact of the handheld device with a sensing surface of the digitizer system.

15. The handheld device of claim 12, wherein the circuit is configured to dynamically update the first delay while the handheld device is being used to interact with the digitizer system.

16. The handheld device of claim 12, wherein the circuit is configured to:
  detect a second delay associated with the transmitting, incurred by the analog transmitter; and
  define timing to transmit the second signal based on the timing of the receiving, the first delay and the second delay.

17. The handheld device of claim 12, wherein the circuit is configured to correct a phase shift between the second signal and a receiver of the digitizer system.

18. A method comprising:
  receiving signals bursts by wireless transmission from a handheld device interacting with a digitizer sensor, wherein the signal bursts are received over defined transmission periods;
  detecting energy of the signal bursts received by the digitizer sensor;
  transmitting commands to the handheld device to shift timings of the transmission periods by an array of pre-defined shifts over an array of subsequent cycles;
  selecting one of pre-defined shifts in the array based on a detected power associated with the one pre-defined shift; and
  transmitting a command to the handheld device to calibrate timing of the transmission periods by the selected pre-defined shift.

19. The method of claim 18, wherein the commands to the handheld device to shift timings of the transmission periods is transmitted based on an iterative process and in which a change in gain due to a shift in timing are detected at each iteration.

20. The method of claim 18, wherein the pre-defined shifts are in an order of magnitude of 1 millisecond.

* * * * *